United States Patent [19]
Furuya

[11] Patent Number: 5,191,789
[45] Date of Patent: Mar. 9, 1993

[54] METHOD AND SYSTEM FOR DETECTING INTAKE AIR FLOW RATE IN INTERNAL COMBUSTION ENGINE COUPLED WITH SUPERCHARGER

[75] Inventor: Junichi Furuya, Isesaki, Japan

[73] Assignee: Japan Electronic Control Systems Co., Ltd., Isesaki, Japan

[21] Appl. No.: 797,971

[22] Filed: Nov. 26, 1991

[30] Foreign Application Priority Data

Nov. 27, 1990 [JP] Japan .................................. 2-321044
Nov. 27, 1990 [JP] Japan .................................. 2-321046

[51] Int. Cl.⁵ ............................................ G01M 15/00
[52] U.S. Cl. ................................................. 73/118.2
[58] Field of Search ................. 73/118.2, 117.3, 204.11

[56] References Cited
U.S. PATENT DOCUMENTS 5,070,846 12/1991 Dudek et al. .................. 73/118.2 X

FOREIGN PATENT DOCUMENTS

58-150040 6/1983 Japan .
59-49334 3/1984 Japan .
61-132732 6/1986 Japan .
1-224424 9/1989 Japan .

Primary Examiner—Jerry W. Myracle
Attorney, Agent, or Firm—Foley & Lardner

[57] ABSTRACT

An internal combustion engine coupled with a supercharger includes an air flow meter positioned upstream of the compressor of the supercharger. The engine also has an intercooler disposed between the compressor and a throttle valve. Variation in an amount of air in a boost chamber between the compressor and the throttle valve are derived on the basis of the volume of the boost chamber and variations of the boost pressure detected between the intercooler and the throttle valve. The intake air flow rate detected by the air flow meter is corrected by the thus calculated variations in the amount of air.

14 Claims, 7 Drawing Sheets

Fig.8

METHOD AND SYSTEM FOR DETECTING INTAKE AIR FLOW RATE IN INTERNAL COMBUSTION ENGINE COUPLED WITH SUPERCHARGER

BACKGROUND OF THE INVENTION (1) Field of the Invention

The present invention relates to a method and a system for detecting an intake air flow rate in an internal combustion engine provided with a supercharger. More particularly, the invention realtes to a technology for correcting an error in an air flow meter during an engine transition state.

(2) Related Art of the Invention

In an electronic control system for controlling a supply of an internal combustion engine, it is known to control the fuel supply amount on the basis of an intake air flow rate detected by an air flow meter. (see Japanese Unexamined Patent Publication (Kokai) No. 58-150040, Japanese Unexamined Patent Publication No. 59-49334)

In an internal combustion engine having an induction system using a normal aspiration, and when the volume between the air flow meter and a throttle valve is relative small, the air flow rate detected by the air flow meter coincides approximately with the air flow rate passing through the throttle valve.

Conversely, in an internal combustion engine having a supercharger, an amount of air in a boost chamber defined between a compressor of the supercharger and the throttle valve can be fluctuated by variations in the boost pressure during an engine transition state.

Therefore, in the internal combustion engine having a supercharger, the air flow meter detects variations of the amount of air in the boost chamber, in conjunction with the air passing through the throttle valve during the engine transition state. Therefore, the air flow rate detected by the air flow meter may be different from the amount of air to be introduced into the engine through the throttle valve, in an amount substantially corresponding to variations of the amount of air in the boost chamber.

Accordingly, during a transition state of the internal combustion engine having a supercharger, a precision of the level of detection of the intake air flow rate is lowered, to thus lower the precision of the air/fuel ratio control and possibly adversely affect the drivability and exhaust emission control.

SUMMARY OF THE INVENTION

Therefore, an object of the present invention is to provide a method and system for detecting an intake air flow rate, which can correct an error in a detection of the intake air flow rate in an air flow meter during a transition state of an internal combustion engine having a supercharger, and whereby a control of an air/fuel ratio in a fuel supply control system, based on an intake air flow rate, is improved.

Another object of the present invention is to enable a stable detection of variations of a boost pressure, regardless of whether the engine operating condition is a transition state or steady state, and thus enable a prediction of a variation amount of air for a boost chamber depending upon a variation of the boost pressure, with a high precision.

A further object of the present invention is to make it possible to correct the intake air flow rate based on the detected boost pressure with a simple construction, even in an induction system having a plurality of mutually independent induction systems, for which a plurality of superchargers are provided independently of each other.

To achieve the above objects, a method and a system for detecting an intake air flow rate for an internal combustion engine having a supercharger, according to the present invention, includes a throttle valve within an air induction passage downstream of a compressor of a turbocharger, and an air flow meter for detecting an intake air flow rate, disposed within the air induction passage upstream of the compressor. Based on a volume of a boost chamber defined between the compressor and the throttle valve, and variations of a boost pressure, a variation of an amount of air the boost chamber is predicted. The intake air flow rate detected by the air flow meter is corrected on the basis of the predicted amount of variation.

With such a construction, since the variation of the amount of air in the boost chamber is not a variation of the amount of air to be introduced into the engine through the throttle valve, an actual intake air amount to be actually introduced into the engine can be detected by correcting the intake air flow rate, which includes a component corresponding to the variation of the amount of air in the boost chamber, based on variations of the amount of the air in the boost chamber.

Here, when an intercooler is provided for cooling the boosted intake air between the compressor and the throttle valve, it is preferable to detect the boost pressure at a position between the intercooler and the throttle valve.

As set forth above, by detecting the boost pressure at the position between the intercooler and the throttle valve, the variation of the amount of air in the boost chamber can be predicted with a higher precision, based on a boost pressure having a higher sensitivity to a movement of the throttle valve.

On the other hand, where boost air induction systems including the compressor and the throttle valve are branched into a plurality of parallel and independent passages at a position downstream of the air flow meter, it is desirable to detect the boost pressure as a composite pressure of the respective branched induction systems.

The construction for detecting the boost pressure as the composite pressure of a plurality of branched boost air induction systems may be applied when an intercooler is provided. In such a case, the boost pressure between the intercoolers and the throttle valves are composed with respect to the respective induction systems.

With the construction for detecting the composite pressure of the respective induction systems, the number of boost pressure sensor employed for a plurality of boost air induction systems can be successfully reduced.

Furthermore, when a prediction of variations of the amount of air in the boost chamber is performed, it is preferred to perform the prediction by taking the intake air temperature into account.

Since the air amount (density) in the boost chamber is variable, depending upon the instantaneous pressure and the intake air temperature, the precision level can be raised by employing the intake air temperature as a parameter for predicting the amount of air filled in the boost chamber.

Furthermore, it is possible to predict variations of the amount of air in the boost chamber, on the basis of variations of the boost pressure, the volume of the boost chamber, and a correction coefficient corresponding to the absolute level of the boost pressure.

In the simplest way, the variations of the amount of air in the boost chamber can be predicted based on variations of the boost pressure and volume of the boost chamber, but by employing a correction coefficient corresponding to the absolute level of the boost pressure, an enhanced predication can be achieved while maintaining the simplicity of the prediction.

It is further preferred to switch the time frame for deriving the variations of the boost pressure, between the transition state and the steady state of the engine.

Due to the construction for switching the time frame, a longer time frame can be used for small variations of the boost pressure and a shorter time frame can be used for large variations of the boost pressure, to thus effectively detect variations of the boost pressure.

Other objects and advantages of the present invention will become clear from the disclosure of the preferred embodiment given herebelow, with reference to the accompanying drawings.

PREFERRED EMBODIMENT

The preferred embodiment of a method and system for detecting intake air flow rate for an internal combustion engine having a supercharger is illustrated in FIGS. 2 to 10.

Figure 1:
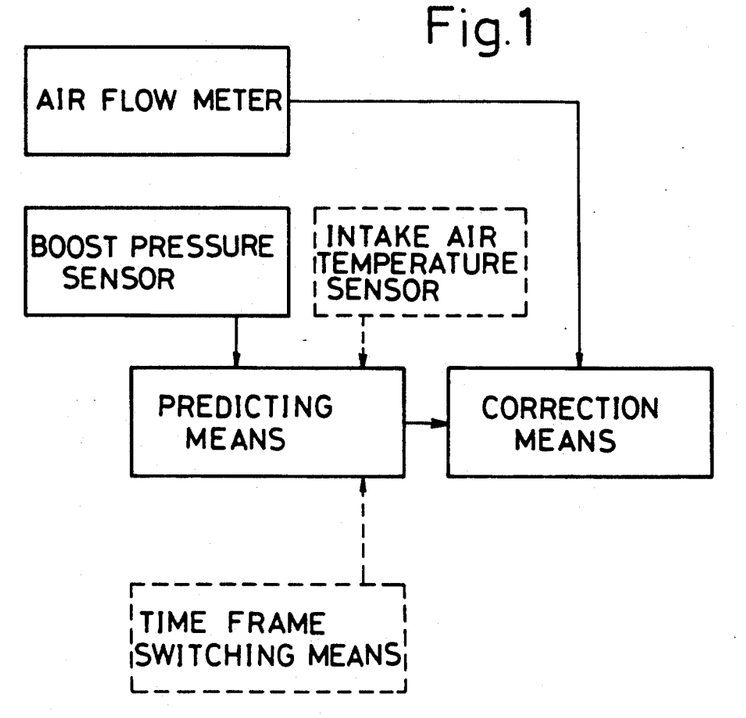
FIG. 1 is a block diagram showing the basic construction of the intake air flow rate detecting system for an internal combustion engine having a supercharger, according to the present invention.

The principle of the intake air flow rate detecting system for the internal combustion engine having a supercharger, according to the present invention, is illustrated in FIG. 1. The following discussion will be given also with reference to FIG. 1.

Figure 2:
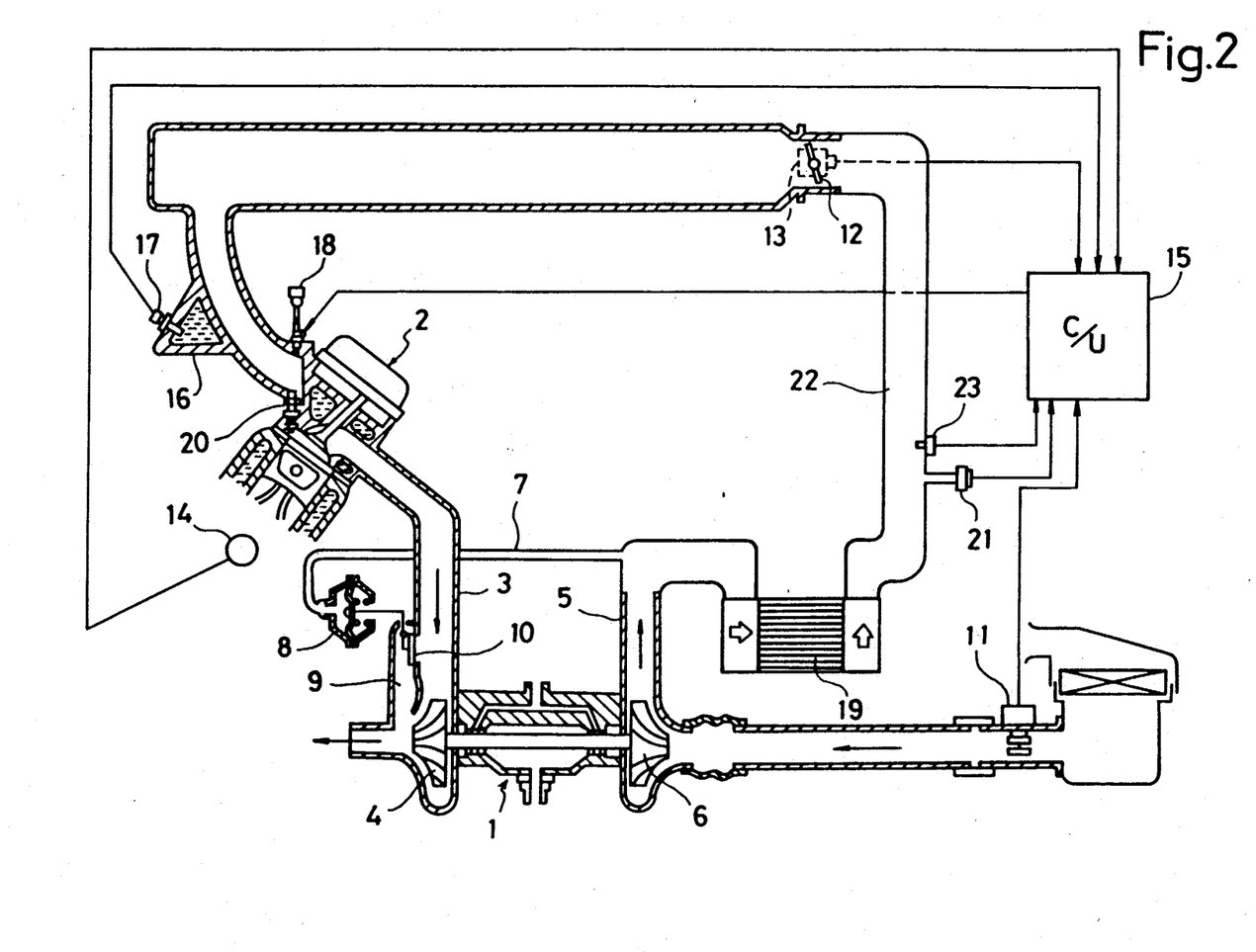
FIG. 2 is an illustration showing a system construction of one embodiment of the present invention, illustrated as a hardware construction.

In the preferred systen construction illustrated in FIG. 2, an internal combustion engine 2 is provided with a turbocharger 1 as a supercharger for supplying boost air. The turbocharger 1 is designed to drive an exhaust turbine 4 with an energy of an exhaust gas discharged through an exhaust passage 3, and thus drive a compressor 6 disposed within an induction passage 5 and coupled with the exhaust turbine 4 for boosting the intake air.

The intake air pressure (boost pressure) downstream of the compressor 6 is introduced into a pressure chamber of a diaphragm type actuator 8 via a pressure passage 7. The diaphragm type actuator 7 is designed to operate a waste gate valve 10 which opens and closes an exhaust gas bypass passage 9 bypassing the exhaust turbine, depending upon the pressure (boost pressure) introduced into the pressure chamber.

To a control unit 15 are input, an intake air flow rate signal Q directly detected by a hot wire type air flow meter 11, which is disposed within the induction passage 5 upstream of the compressor, a throttle valve open angle signal TVO detected by a throttle angle sensor 13, which is coupled with a throttle valve disposed within the induction passage 5 downstream of the compressor 6, an engine revolution speed signal N detected by an engine speed sensor 14, such as a crank angle sensor and so on, a coolant temperature signal Tw detected by an engine coolant temperature sensor 17 disposed within a water jacket of the engine 2, and so forth.

The control unit 15 calculates a basic fuel injection amount Tp based on the intake air flow rate Q detected by the air flow meter 11 and the engine revolution speed N detected by the engine speed sensor 14. The control unit 15 corrects the basic fuel injection amount Tp based on correction parameters, such as the coolant temperature Tw detected by the engine coolant temperature sensor 17 for determining a final fuel injection amount Ti.

The control unit 17 thus obtains a drive pulse having a pulse width corresponding to the fuel injection amount Ti, and outputs the drive pulse at a predetermined timing in synchronism with the engine revolutions to a fuel injection valve 18. the fuel injection valve 18 is driven to intermittently open for a period corresponding to the pulse width of the drive pulse, to inject fuel to the engine 2.

In FIG. 2, reference numeral 19 denotes an intercooler for cooling the intake air boosted by the turbocharger 1. Reference numeral 20 denotes a spark ignition plug provided for each combustion chamber.

A boost pressure sensor 21 for detecting the boost pressure P is provided downstream of the intercooler 19 and upstream of the throttle valve 12.

The control operation to be executed by the control unit 15 for detecting the intake air flow rate will be discussed herebelow with reference to the flowcharts of FIGS. 3 to 6.

It should be appreciated that the functions of a prediction means, a correction means and a time frame switching means are realized by software architecture of the control unit 15, as illustrated in FIGS. 3 to 6.

Figure 3:
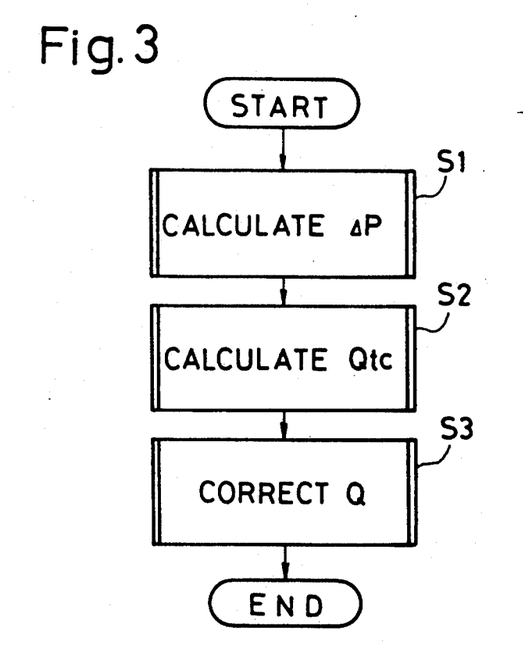
FIG. 3 is a flowchart showing a content of a basic process of a correction of an intake air flow rate in the preferred embodiment.

The flowchart of FIG. 3 briefly shows the overall process of a correction control for correcting the intake air flow rate Q detected by the air flow meter 11 based on variations of the boost pressure P. First, at a step 1 (in the drawings labeled S1; this is true for all steps), the variation magnitude ΔP of the boost pressure detected by the boost sensor 21 is calculated. At step 2, a correction value Qtc is calculated for correcting the intake air flow rate Qa detected by the air flow meter 11 on the basis of the variation magnitude ΔP of the boost pressure P.

At step 3, using the correction value Qtc, the intake air flow rate Qa detected by the air flow meter 11 is corrected, and then the corrected intake air flow rate Qs is set as the final detected value, for deriving the basic fuel injection amount Tp.

The detailed processes of steps 1 through 3 set forth above will be discussed with reference to FIGS. 4 to 6.

Figure 4:
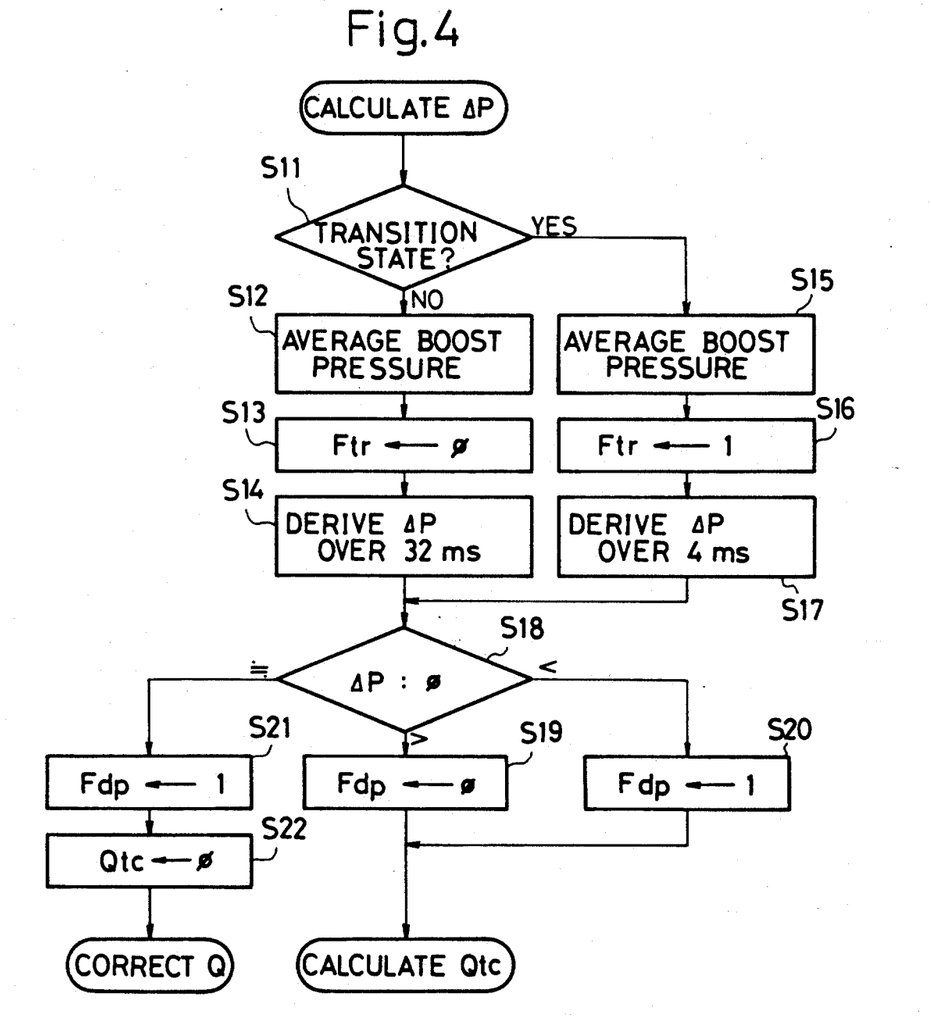
FIG. 4 is a flowchart showing a process of a calculation of a variation magnitude of the boost pressure.

The detailed process at step 1 for calculating the variation magnitude ΔP is illustrated in the form of a flowchart in FIG. 4. Here, first, at step 11, a discrimination is made of whether or not the engine 2 is in the transition state. The discrimination is performed on the basis of variations of the degree of opening of the throttle valve 12 as monitored by the throttle angle sensor 13, for example.

For example, when the degree of opening of the throttle valve is substantially constant, and if it is judged that the engine 2 is in the steady state at step 11, an averaging process for the detected value of the boost pressure sensor 12 is performed at step 12. Subsequently a flag Ftr representative of a transition state and steady state of the engine is reset to "0", for indicating the steady state, at step 13. Then, at step 14, by subtracting the value detected 32 ms previously from the current detected value of the boost pressure as averaged at the step 12, a variation magnitude ΔP of the boost pressure over 32 ms is derived.

On the other hand, when the degree of opening of the throttle valve 12 varies as checked at step 11, and thus it is judged that the engine 2 is in the transition state, an averaging process for the detected value of the boost pressure is performed at step 15. Then, at step 16, the flag Ftr is set to "1", to indicate the engine transition state. Subsequently, at step 17, by subtracting the detected value of the boost pressure detected 4 ms previously from the currently detected value of the boost pressure, the variation magnitude ΔP of the boost pressure P over 4 ms period is derived.

It should be noted that the averaging process for the detected value of the boost pressure is performed both in the transition state and the steady state of the engine, to absorb pulsations of the boost pressure. To eliminate delay of the averaged value relative to the currently detected boost pressure value, it is preferred to provide a greater weight for the recently obtained detected values. It is also possible to perform an averaging process for the detected boost pressure only during the engine steady state, and not to perform the averaging process during the transition state.

On the other hand, the reason for switching the time frame over when the variation magnitude ΔP of the boost pressure P calculated between the transition state and the steady state, so that the variation magnitude ΔP is derived over a longer time frame during the steady state of the engine 2, is as set out herebelow.

Namely, as can be naturally appreciated, it is preferable to use shorter time frame for precisely detecting the variation magnitude ΔP, but when a variation of the boost pressure is so slow during the steady state that the variation magnitude ΔP over a short time frame becomes smaller than a resolution of the system, such a slow variation cannot be detected. Therefore, in the shown embodiment, during a transition state, the variation magnitude ΔP of the boost pressure is calculated at every 4 ms, for obtaining the variation over a 4 ms time frame, and during a steady state, a calculation for the variation magnitude ΔP is performed every 4 ms for obtaining the variation over a 32 ms time frame. It should be noted that the time frame is specified for these periods, i.e. 4 ms and 32 ms, and can be appropriately selected for any period.

After deriving the variation magnitude ΔP through the processes as set forth above, a direction of variation of the boost pressure is discriminated on the basis of a positive of a negative variation magnitude ΔP.

When the variation magnitude ΔP is a positive value, and thus the boost pressure is increasing (during acceleration), the process is advanced for setting a flag Fdp which indicates the variation direction of the boost pressure P, to "0" to indicate the accelerating state. On the other hand, when the variation magnitude ΔP is a negative value, and thus the boost pressure P is decreasing (during deceleration), the process is advanced to a step 20 to set the flag Fdp to "1", to indicate a deceleration state.

On the other hand, when the variation magnitude ΔP is approximately zero, and therefore, the boost pressure P is substantially not varied (during a steady state), the process is advanced to step 21 to set the flag Fdp to "1". After setting the flag at step 21, the correction value Qtc for the the intake air flow rate Q is set to zero so that the correction for the intake air flow rate Q based on the variation of the boost pressure P is cancelled, at step 22.

When the process at step 22 is performed due to substantially no variation of the boost pressure, the process for calculating the correction value Qtc is not performed and the process is directly advanced to a correction of the intake air flow rate Q. In contrast, when a variation of the boost pressure is detected and process of step 19 or 20 is performed, the process is moved to a step for calculating the correction value Qtc to correct the intake air flow rate corresponding to the variation of the boost pressure P.

Figure 5:
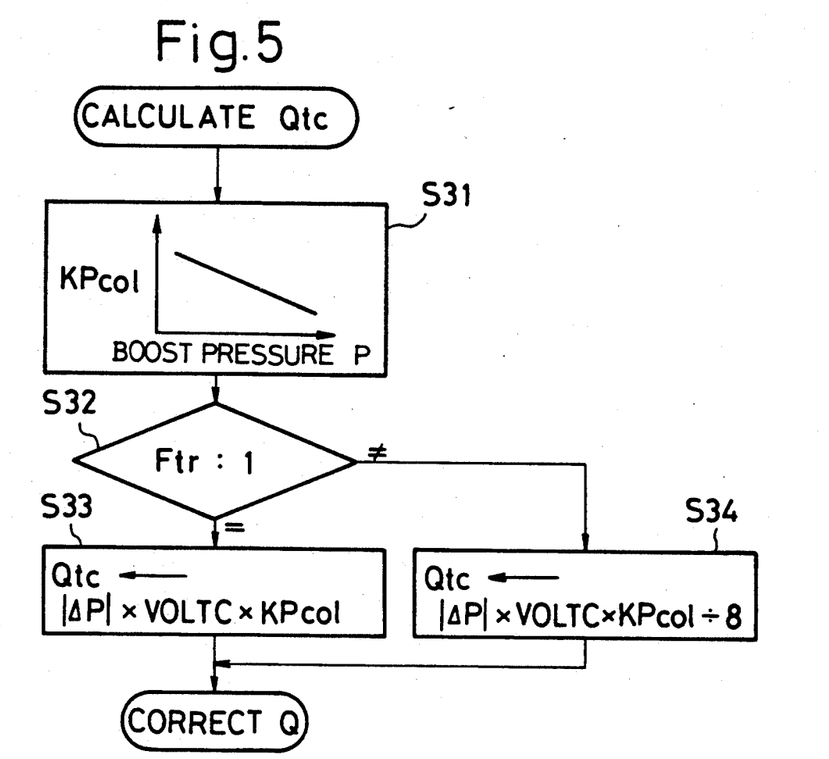
FIG. 5 is a flowchart for a calculation of a correction value Qtc corresponding to the variation component of the air in a boost chamber.

The process for deriving the correction value Qtc of the step 2 in the flowchart of FIG. 3 is illustrated in detail in FIG. 5.

In the flowchart of FIG. 5, first, at step 31, a correction coefficient KPcol based on the absolute level of the boost pressure P through looking up a map. The correction coefficient KPcol is set to be smaller for a greater boost pressure P. The characteristics of the correction coefficient KPcol will be discussed in detail later.

At step 32, the flag Ftr, which is set or reset through the process of the flowchart of FIG. 4, is checked. When the engine is in the transition state, and thus the flag Ftr is set to "1", the process is advanced to a step 33 for calculating the correction value Qtc corresponding to variations of the air in the boost chamber 22 between the compressor 6 and the throttle valve 12, with the following formula:

$$Qtc \rightarrow |\Delta P| \times VOLTC \times KPcol.$$

Here $|\Delta P|$ is an absolute value of the variation magnitude of the boost pressure derived over 4 ms period, and VOLTC is a constant depending upon the volume of the boost chamber 22 between the compressor 6 and the throttle valve 12.

On the other hand, when it is judged at step 32 that the flag Ftr is set to "0" and the engine is in the steady state, the process is advanced to step 34 to calculate the correction value Qtc according to the following formula:

$$Qtc = \frac{|\Delta P| \times VOLTC \times KPcol}{8}$$

In the foregoing calculation, since $|\Delta P|$ is the absolute value of the variation magnitude of the boost pressure over 32 ms, as derived at step 14, for converting the variation magnitude into that within 4 ms to make it coincide with that during the transition state, a divisor "8" is employed.

Next, the process of correction for the detected value Qa of the air flow meter 11 based on the above-mentioned correction value Qtc will be discussed according to the flowchart of FIG. 6.

At first, at step 41, a check is performed of whether the flag Fdp, which is set or reset, depending upon the variation direction of the boost pressure P during the process of the flowchart of FIG. 4.

Here, when the flag Fdp is set to "0" (reset) and thus the boost pressure P is increasing, the process is advanced to a step 42 for subtracting the correction value Qtc from the intake air flow rate Qa detected by the air flow meter 11, to set the resultant value as the final detected value Qs.

On the other hand, when the flag Fdp is set to "1" (set) and thus the boost pressure P is decreasing (or boost pressure is held constant resulting in setting "0" of the correction value Qtc), the process is advanced to step 43 to correct the intake air flow rate detected by the air flow meter 11 by adding the correction value Qtc. The resultant value is then set as the final detected value Qs.

Based on the final detected value Qs as derived at step 42 or 43, the basic fuel injection amount Tp is calculated. The fuel injection valve 18 is driven on the basis of the basic fuel injection amount Tp thus derived, for electronically controlling the fuel supply amount.

The following is a further detailed discussion of equations used for deriving the correction value Qtc on the basis of the variation magnitude $\Delta P$ of the boost pressure P.

In the shown embodiment, in the internal combustion engine coupled with the supercharger, assuming that the portion of the induction passage between the compressor of the supercharger and the throttle valve forms the boost chamber 22, the amount of air in the boost chamber 22 varies according to a variation of the boost pressure. Therefore, the air flow meter 11 detects the intake air flow rate as a sum of the intake air amount passing through the throttle valve and the component corresponding to the variation of the air amount to be filled in the boost chamber. Therefore, to obtain the actual amount of air passing through the throttle valve, it becomes necessary to correct the variation component of the air in the boost chamber.

Here, the amount Qcol of the air in the boost chamber 22 can be calculated from the following equation:

$$Qcol = \rho 1 \times Ccol = \rho 0 \times \frac{T0}{T1} \times \frac{P1}{P0} \times Vcol$$

In the foregoing equation, $\rho 1$ is an actual air density in the boost chamber 22, Vcol is a volume of the boost chamber, $\rho 0$ is reference air density, T0 is a reference temperature of the intake air in the boost chamber 22, T1 is an actual temperature of the intake air in the boost chamber 22, P1 is an actual boost pressure, and P0 is a reference pressure.

In the foregoing equation, assuming that the boost pressure after a given period $\Delta Pt$ is P2, the variation amount $\Delta Qcol$ of the air in the boost chamber within the unit period $\Delta t$ can be expressed by the following equation:

$$\Delta Qcol = \frac{(Qcol2 - Qcol1)}{\Delta t} =$$

$$\frac{\rho 0 \times \frac{T0}{P0} \times Vcol \times \left(\frac{P2}{T2} - \frac{P1}{T1}\right)}{\Delta t}$$

Here, assuming that the variation of air in the boost chamber 22 is an adiabatic change, since $$\frac{T1}{T2} = \left(\frac{P2}{P1}\right)^{\frac{1}{n-1}}$$

from the equation for politropic change, the equation for calculating the variation amount $\Delta Qcol$ for the air in the boost chamber 22 can be expressed as follows:

$$\Delta Qcol = \frac{\rho 0 \times Vcol \times \left(\frac{P1}{P0}\right)^{\frac{1}{n}} \times \left(\left(\frac{P2}{P1}\right)^{\frac{1}{n}} - 1\right)}{\Delta t}$$

In the foregoing equation for deriving the variation amount $\Delta Qcol$ of the air to be filled in the boost chamber, assuming that politropic index n is 1.4, and the variation of the boost pressure (P2 − 1 P1) is sufficiently small, the following equation can be established:

$$\left(\frac{P2}{P1}\right)^{\frac{1}{n}} - 1 \approx 0.7143 \times \frac{P2 - P1}{P1}$$

Accordingly, the foregoing equation for $\Delta Qcol$ can be modified as:

$$\Delta Qcol = \frac{\rho 0 \times Vcol \times \left(\frac{P1}{P0}\right)^{\frac{1}{n}} \times 0.7143 \times \frac{P2 - P1}{P1}}{\Delta t} \quad (1)$$

In the foregoing equation (1), $\rho 0 \times Vcol \times 0.7143/\Delta t$ is constant, and $(P1/P0)^{1/n}/P1$ becomes a coefficient determined by P1. Therefore, by setting $\rho 0 \times Vcol \times 0.7143/\Delta t = VOLTC$, and $(P1/P0)^{1/n}/P1$ is KPcol derived through map look-up in terms of the boost pressure P, the foregoing equation (1) can be simplified as shown below, which is used in the shown embodiment set forth above. Namely, the variation of the air in the boost chamber can be predicted from the volume of the boost chamber Vcol, the variation of the boost pressure $\Delta P$, and the absolute value of the boost pressure P through the following equation:

$$Qtc = \Delta Qcol = VOLTC \times (P2 - P1) \times KPcol = VOLTC \times |\Delta P| \times KPcol \quad (2)$$

Namely, by deriving the variation amount $\Delta P = (P2 - P1)$ of the boost pressure P during the given period $\Delta t$, and deriving KPcol by a map look-up in terms of the absolute value of the boost pressure P, the variation amount $\Delta Qcol$ of the air in the boost chamber 22 can be obtained. When the boost pressure P is increasing (P2>P1), the amount of air in the boost chamber is increased by $\Delta Qcol$. The air flow meter 11 detects the intake air flow rate including this value $\Delta Qcol$. Therefore, by substracting the value $\Delta Qcol$ (Qtc) from the detected value Qa of the air flow meter 11, the actual air flow rate passing through the throttle valve can be obtained.

Similarly, when the boost pressure P is decreasing (P2<P1), the amount of air in the boost chamber 22 is decreased by $\Delta Qcol$. As a result, the detected value Qa of the intake air as detected by the air flow meter 11 becomes smaller than that actually flowing through the throttle valve, by the corresponding amount. Therefore, by adding $\Delta Qcol$ (Qtc) to the detected value Qa, the actual air flow rate passing through the throttle valve can be obtained.

It should be noted that, since the correction coefficient KPcol corresponds to above-mentioned (P1/P0)$^{1/n}$/P1, it should have characteristics becoming smaller according to an increase of the boost pressure, essentially in a linear fashion. It is, of course, possible to arithmetically derive the correction coefficient KPcol by calculating (P1/P0) $^{1/n}$/P1, but a map look-up is preferred for simplicity In addition, the condition wherein the variation of the boost pressure becomes maximum is an acceleration from the low load condition (non-boosting range). Therefore, assuming that P1 = P0 in the foregoing equation (1), (P1/P0)$^{1/n}$ can be approximated to 1. Therefore, the equation of $\Delta Qcol$ can be simplified as:

$$\Delta Qcol = \frac{p0 \times Vcol \times 0.7143 \frac{P2 - P1}{P1}}{\Delta t}$$

Here, regarding the denominator P1 of (P2−P1)/P1 is approximately equal to P0, all elements except for (P2−P1) become constants. Therefore, setting VOLTC = $p0 \times Vcol \times 0.7143/P0/\Delta t$, $$\Delta Qcol = VOLTO \times (P2 - P1) \quad (3)$$

From this, the variation amount $\Delta Qcol$ of the air in the boost chamber 22, which corresponds to the error in detection of the air flow meter 11, can be predicted based on the volume Vcol of the boost chamber 22 between the compressor 6 and the throttle valve 12, the variation magnitude $\Delta P$ of the boost pressure.

When a prediction is performed by neglecting a correction element based on the absolute value of the boost pressure P, as in the foregoing equation (3), a substantial error may be caused due to variations of the absolute level of the boost pressure. Therefore, it is preferable to calculate the variation amount $\Delta Qcol$ of the air in the boost chamber by employing the correction coefficient KPcol derived depending upon the absolute level of the boost pressure P.

In the foregoing discussion, the variation amount $\Delta Qcol$ is calculated without employing the parameter of the intake air temperature, but since the intake air temperature influences the amount Qcol of air in the boost chamber, as shown in the equation below, it may be possible to provide an intake air temperature sensor 23 between the intercooler 19 and the throttle valve 12 as shown in FIG. 2 for detecting the intake air temperature TB, and calculate the variation amount $\Delta Qcol$ of the air amount in the boost chamber using the detected value of the intake air temperature sensor 23.

$$Qcol = p1 \times Vcol = p0 \times \frac{T0}{T1} \times \frac{P1}{P0} \times Vcol$$

Here, the embodiment employing the intake air temperature TB as detected by the intake air temperature sensor 23 will be discussed herebelow with reference to FIGS. 7 and 8. It should be appreciated that the software function illustrated in FIGS. 7 and 8 serves as a prediction means.

Figure 7:
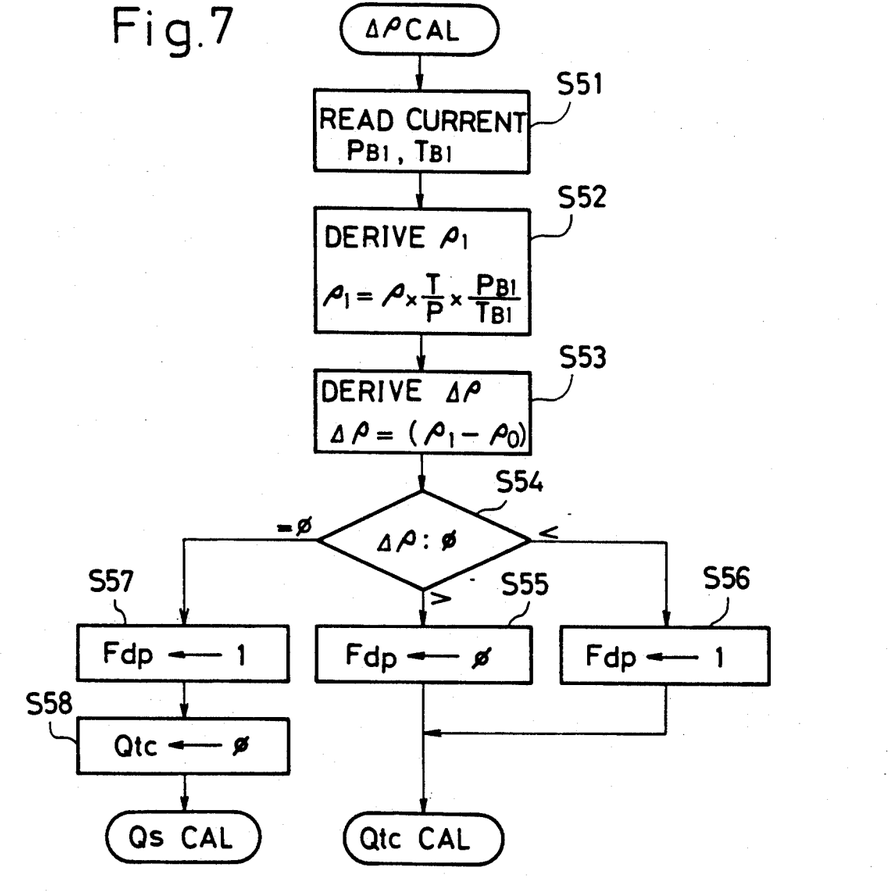
FIG. 7 is a flowchart showing a process of a calculation of variations of an air density in the boost chamber, on the basis of the boost pressure and the intake air temperature.

In the flowchart of FIG. 7, at a step 51, the current values of the boost pressure $P_1$ and the intake air temperature $TB_1$ are read out from the boost pressure sensor 21 and the intake air temperature sensor 23.

At a step 52, an air tensity $\rho_1$ at the current boost pressure $P_1$ and the intake air temperature $TB_1$ on the basis of the reference boost pressure P, the reference intake air temperature T and the reference air density $\rho$, from the following equation:

$$\rho_1 = \rho \times \frac{T}{P} \times \frac{P_1}{TB_1}$$

Then, at step 53, a variation $\Delta\rho(=\rho_1-\rho_0)$ during each cycle of execution of the shown routine is obtained by calculating a difference between the air density $\rho_1$ as calculated at the foregoing step 52 and the air density $\rho_0$ similarly calculated in the immediately preceding execution cycle.

At step 54, a discrimination is made of whether the air density variation $\Delta\rho$ is positive or negative. When the air density variation $\Delta\rho$ is positive, and thus the air density is increasing, the process is advanced to step 55 to set the flag Fdp to "1". On the other hand, when the air density variation $\Delta\rho$ is negative, and therefore, the air density $\rho$ is decreasing, the process advances to step 56 to set the flag Fdp to "0". When the air density variation $\Delta$ is essentially zero, and therefore, the air density is substantially maintained unchanged, the flag Fdp is set to "1" at step 57, and the correction value Qtc is set to zero (0) at step 58, to cancel a correction of the intake air flow rate Qa.

Namely, when the intake air density $\rho$ in the boost chamber 22 is varied, the air in the boost chamber 22 is varied. Therefore, an error may occur in the air flow rate measured by the air flow meter 11. Whereas, when the air density $\rho$ in the boost chamber 22 is maintained constant, and thus the air in the boost chamber is held substantially constant, the intake air flow rate as measured by the air flow meter 11 substantially coincides with that flowing through the throttle valve 12, and therefore, no correction is necessary.

Figure 8:
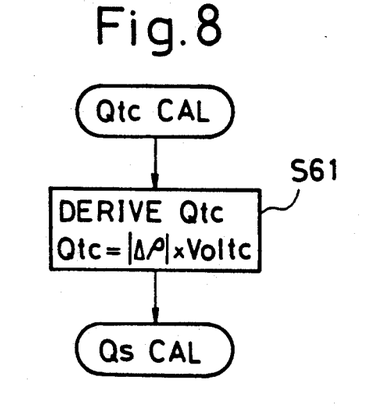
FIG. 8 is a flowchart showing a calculation of the correction value Qtc from the air density variation.

The calculation for obtaining the correction value Qtc based on the air density $\rho$ is illustrated in the flowchart of FIG. 8.

In the flowchart of FIG. 8, the correction amount Qtc is calculated through the following equation, at step 61.

$$Qtc = |\Delta\rho| \times VOLTC.$$

Here, VOLTC is the correction constant derived from $\rho O \times V col \times 0.7143/\Delta t = VOLTC$. By multiplying the air density variation $\Delta \rho$ with the correction constant VOLTC, the correction value Qtc corresponding to variation of the air in the boost chamber 22 within a unit time can be obtained.

Figure 6:
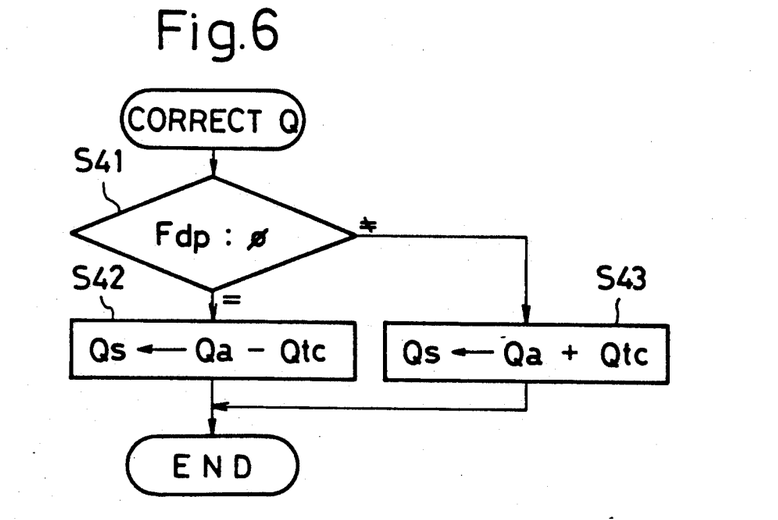
FIG. 6 is a flowchart showing a correction of the detected value of the air flow meter, with the correction value Qtc.

A correction based on the correction value Qtc can be practically implemented through the process shown in the flowchart of FIG. 6, which corresponds to the correction means.

According to the shown embodiment, since the boost pressure sensor 21 used for correction of the intake air flow rate detects the boost pressure PB between the intercooler 19 and the throttle valve 12, the air density variation $\Delta \rho$ (variation of air in the boost chamber) during a transition state can be detected with high response characteristics.

Namely, if the boost pressure is detected upstream of the intercooler 19, it can be used for detecting the boost condition by the compressor, but since the intercooler, which buffers pressure variation between the throttle valve and the boost pressure sensor, is present, a delay in the response to the pressure variation in the boost chamber 22 associated with a variation of the degree of opening of the throttle valve can occur at the initial stage of a transition state.

In contrast, as in the shown embodiment, when the boost pressure between the intercooler 19 and the throttle valve 12 is detected since a pressure variation in the boost chamber 22 quickly occurs in response to variation of the degree of opening of the throttle valve 12, variations of the boost pressure downstream of the intercooler during a transition state can be detected with a high response.

Accordingly, when the boost system incorporates the intercooler as in the shown embodiment, the air density variation $\Delta \rho$ in the boost chamber 22 can be detected with a high response, and therefore, correction of the intake air flow rate can be made with a high response.

Figure 10:
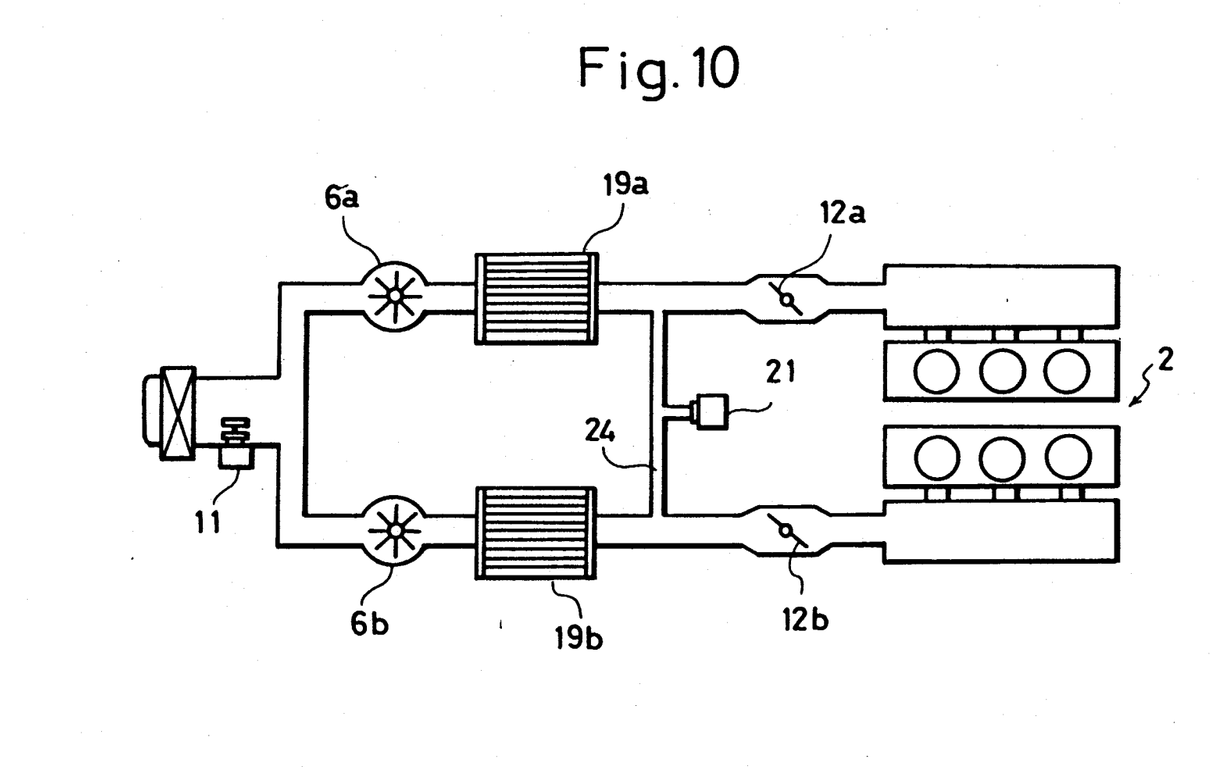
FIG. 10 is an illustration showing a system construction for detecting a boost pressure in the V-type cylinder engine.

The foregoing discussion occurs a single boost air induction system for the engine, but the case of an induction system having a plurality of mutually independent boost air induction systems, such as those for an engine having a V-shaped cylinder layout having a boost air induction system for the respective banks, where the air flow meter 11 is provided upstream of these induction systems, it is preferred to detect the boost pressure with the construction shown in FIG. 10, and correct the intake air flow rate based on variations of the air in the respective boost chambers.

In FIG. 10, components common to FIG. 2 are represented by the same reference numerals.

In FIG. 10, the induction passage is branched into two passages, downstream of the air flow meter 11. For the respective induction systems, the compressor 6, the intercooler 19 and the throttle valve 12 are provided, in that order. These separate induction systems are designed to supply air to the respective associated sides of the banks of the engine.

The pressure introducing pipe 24 is branched from a position between the intercoolers 19 and the throttle valves 12 of the respective induction systems. The pressure introducing pipes 24 are confluent and are connected to the boost pressure sensor 21, and therefore, the boost pressure sensor 21 detects the boost pressure as the composite pressure of two induction system.

Figure 9:
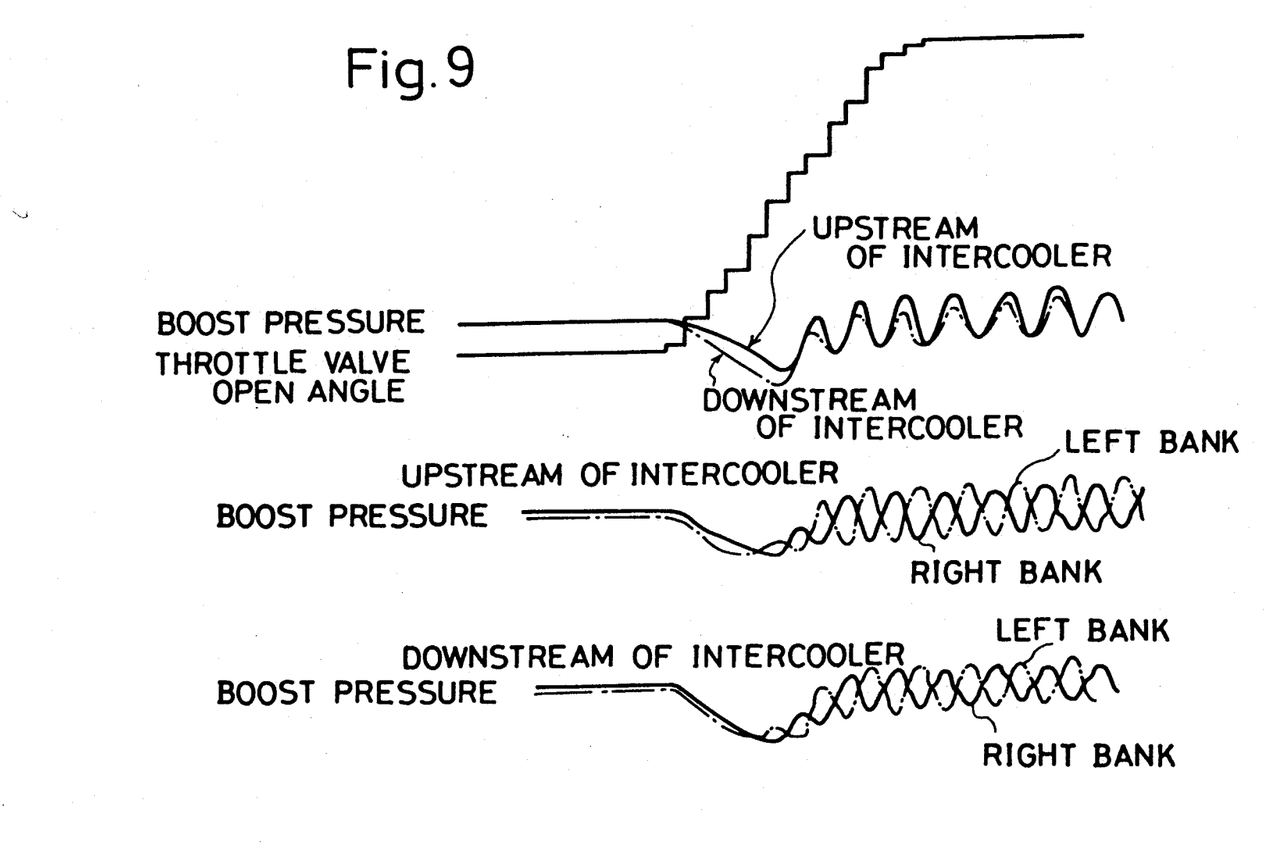
FIG. 9 is a timing chart showing variations of the boost pressure in each bank in an internal combustion engine having a V-shape cylinder layout.

With the shown construction for detecting the boost pressure as the composite boost pressure of respective induction system, by the boost pressure sensors 21, it becomes unnecessary to separately provide the boost pressure sensors for the respective induction systems, and thus number of the sensors required can be reduced. In addition, when pulsations of the intake air flow have opposite phases in the two banks, as shown in FIG. 9, variations of the detected boost pressure due to pulsations of the boost air can be reduced by detecting the composite pressure.

Regarding any possible degradation of the response characteristics of the boost pressure sensor 21 due to the extra length of the pressure introducing pipe for detecting the composite pressure at both banks. Since the shown embodiment detects the boost pressure downstream of the intercooler 19, with a high response to variations of the degree of opening of the throttle valve 12, and delay due to the length of the pressure introducing pipes 24 can be compensated to assure a sufficient response characteristic as required.

Although the shown embodiment has been discussed in terms of an engine having the exhaust turbocharger 1, the present invention is also applicable to an engine coupled with a mechanical supercharger directly or mechanically driven by the engine.

Furthermore, although the shown embodiment employs the intercooler, it is not essential. Where the intercooler is provided, it is preferred to provide the boost pressure sensor between the intercooler 19 and the throttle valve, as set forth above.

What is claimed is:

1. A method of detecting an intake air flow rate for an internal combustion engine having a supercharger, including a throttle valve disposed within an induction passage downstream of a compressor of said supercharger, and an air flow meter disposed within the induction passage upstream of said compressor, the method comprises the steps of:

detecting a boost pressure by said supercharger;
    predicting variations an amount of air in a boost chamber, on the basis of a volume of the boost chamber between said compressor and said throttle valve, and variations of a boost pressure by said supercharger; and
    correcting an intake air flow rate detected by said air flow meter based on the predicted variations of the amount of air in said boost chamber.

2. A method of detecting an intake air flow rate for an internal combustion engine having a supercharger as set forth in claim 1, wherein an intercooler is further provided between said compressor and said throttle valve, for cooling boosted air, and the boost pressure is detected at a position between said intercooler and said throttle valve.

3. A method of detecting an intake air flow rate for an internal combustion engine having a supercharger as set forth in claim 1, wherein a plurality of mutually independent boost air induction systems are branched downstream of said air flow meter, each of said boost air induction systems including said compressor and said throttle valve, and the boost pressure is detected as a composite pressure of the boost pressure at the respective boost air induction systems.

4. A method of detecting an intake air flow rate for an internal combustion engine having a supercharger as set forth in claim 1, wherein a plurality of mutually independent boost air induction systems are branched downstream of said air flow meter, each of said boost air induction systems including said compressor and said throttle valve, an intercooler is provided for each of said boost air induction systems for cooling boosted intake air, and the boost pressure is detected as a composite pressure of the boost pressure between said intercooler and said throttle valve in the respective boost air induction systems.

5. A method of detecting an intake air flow rate for an internal combustion engine having a supercharger as set forth in claim 1, wherein said step of predicting variations of an amount of air in said boost chamber comprises the steps of:

detecting a temperature of an intake air within said boost chamber; and predicting the variations in an amount of air in said boost chamber on the basis of the volume of said boost chamber, variations of the boost pressure, and said intake air temperature.

6. A method of detecting an intake air flow rate for an internal combustion engine having a supercharger as set forth in claim 1, wherein said step of predicting the variations of an amount of air in said boost chamber comprises the steps of:

calculating variations of the boost pressure detected by said boost pressure sensor;

setting a correction coefficient corresponding to the absolute pressure level of the boost pressure detected by said boost pressure sensor; and calculating variations of the amount of air in said boost chamber on the basis of variations of the boost pressure, said correction coefficient, and the volume of said boost chamber.

7. A method of detecting an intake air flow rate for an internal combustion engine having a supercharger as set forth in claim 1, wherein said step of predicting the variations in the amount of air in said boost chamber includes a step of switching over time frames by which variations of the boost pressure are derived depending upon a transition state and a steady state of the engine.

8. An intake air flow rate detecting system for an internal combustion engine having a supercharger, which includes a throttle valve disposed within an air induction passage downstream of a compressor of said supercharger, comprising:

an air flow meter disposed within said air induction passage upstream of said compressor for detecting an intake air flow rate of the engine;

a boost pressure sensor for detecting a boost pressure by said supercharger;

a predicting means for predicting variations in an amount of air in a boost chamber on the basis of the volume of said boost chamber between said compressor and said throttle valve, variations of the boost pressure detected by said boost pressure sensor; and a correction means for correcting an intake air flow rate detected by said air flow meter based on variations in an amount of air in said boost chamber predicted by said predicting mean.

9. An intake air flow rate detecting system for an internal combustion engine having a supercharger as set forth in claim 8, further comprising an intercooler disposed between said compressor and said throttle valve for cooling the boosted air, the boost pressure being detected at a position between said intercooler and said throttle valve.

10. An intake air flow rate detecting system for an internal combustion engine having a supercharger as set forth in claim 8, wherein the air induction passage is branched into a plurality of mutually independent boost air induction systems respectively including said compressors and said throttle valves, and said boost pressure sensor detects the boost pressure in said boost pressure induction systems as a composite pressure thereof.

11. An intake air flow rate detecting system for an internal combustion engine having a supercharger as set forth in claim 8, wherein the air induction passage is branched into a plurality of mutually independent boost air induction systems respectively including said compressors and said throttle valves, an intercooler is disposed between said compressor and said throttle valve in each of said boost air induction systems, and said boost pressure sensor detects the boost pressure between said intercooler and said throttle valve in said boost pressure induction systems as a composite pressure thereof.

12. An intake air flow rate detecting system for an internal combustion engine having a supercharger as set forth in claim 8, further comprising an intake air temperature sensor for detecting the temperature of the intake air within said boost chamber, and said predicting means predicts the variations in an amount air in said boost chamber on the basis of the variations of the boost pressure and the intake air temperature detected by said intake air temperature sensor.

13. An intake air flow rate detecting system for an internal combustion engine having a supercharger as set forth in claim 8, wherein said predicting means predicts variations in an amount of air in the boost chamber on the basis of the volume of the boost chamber, the variation of the boost pressure detected by said boost pressure sensor and a correction coefficient set corresponding to an absolute level of the boost pressure.

14. An intake air flow rate detecting system for an internal combustion engine having a supercharger as set forth in claim 8, further comprising means for switching a time frame used in said predicting means for deriving variations of the boost pressure depending upon a transition state and a steady state of the engine.

* * * * *